Nov. 20, 1928.
A. T. SHERE
1,692,423
GREASE GUN
Filed April 25, 1922    2 Sheets-Sheet 1
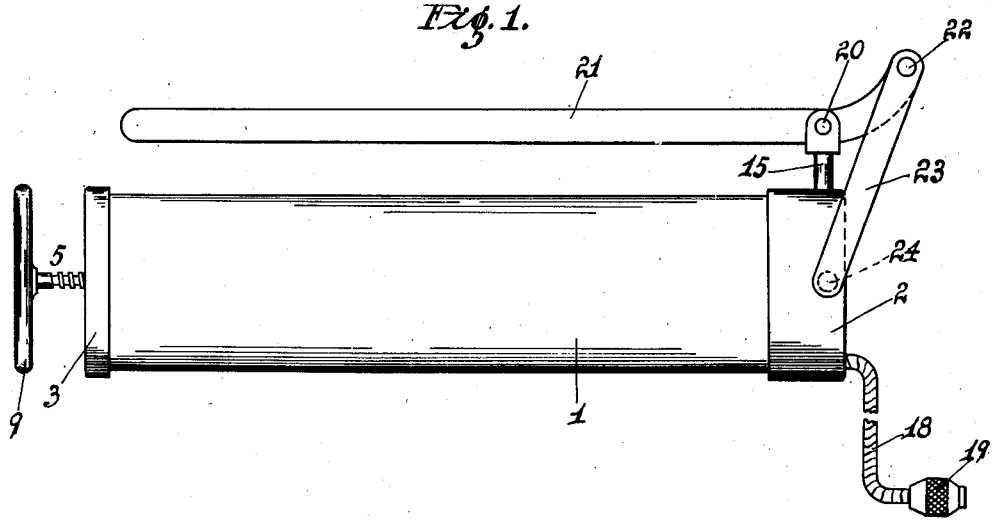
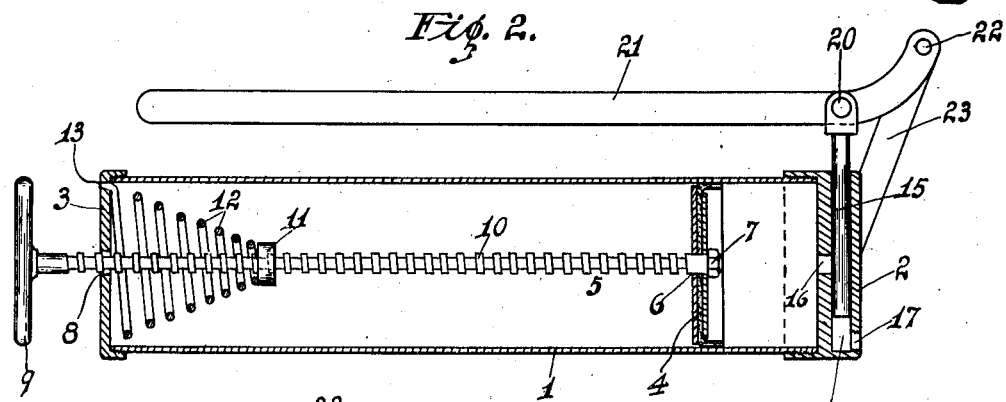
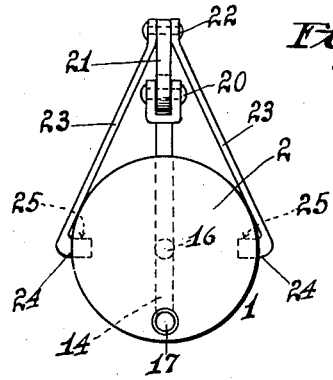
Inventor
Albert T. Shere.
By Harry D. Schwartz
Attorney Nov. 20, 1928.  
A. T. SHERE  
1,692,423  
GREASE GUN  
Filed April 25, 1922  
2 Sheets-Sheet 2

Inventor  
Albert T. Shere

By Harry C. Schroeder  
Attorney

Patented Nov. 20, 1928.

1,692,423

UNITED STATES PATENT OFFICE.

ALBERT T. SHERE, OF OAKLAND, CALIFORNIA, ASSIGNOR, BY MESNE ASSIGNMENTS, TO GAT GUN LUBRICATING CORPORATION, OF OAKLAND, CALIFORNIA, A CORPORATION OF CALIFORNIA.

GREASE GUN.

Application filed April 25, 1922. Serial No. 556,393.

My invention is an improved grease gun for injecting thick greases into automobile bearings and other parts, which is more rapid and efficient, and injects its greases with more force than other similar grease guns.

An object of my invention is to provide a grease gun which may be readily loaded with grease and to mount thereon a booster pump so that the grease may be forced out of the grease gun and through a conduit into the bearings to be greased.

My invention comprises a mechanical method as well as the appliance for greasing the bearings; the mechanical method comprising the loading of a grease gun by inserting the open mouth in a body of grease, pulling on the plunger or piston rod to suck the grease into the grease gun, locking the piston at its innermost position, then attaching a booster pump to the end of the open cylinder and releasing the lock so that the piston, due to a resilient medium, forces grease into the booster pump. This pump is then actuated to force the grease through a conduit into a bearing, and on each return stroke of the pump, creates a vacuum therein which draws grease into the booster pump from the grease gun and at the same time causes the piston in the grease gun to follow the body of grease without any hand manipulation.

This is accomplished by my preferred form of construction in which a smooth rod is connected to the piston and is held by a lock from moving inwardy until the lock is released.

Referring to the annexed drawing in which my invention is illustrated and which forms a part of this specification:

Figure 1 is a side elevation of my grease gun.

Figure 2 is a longitudinal section of my grease gun.

Figure 3 is a front end view of my grease gun.

Figure 4:
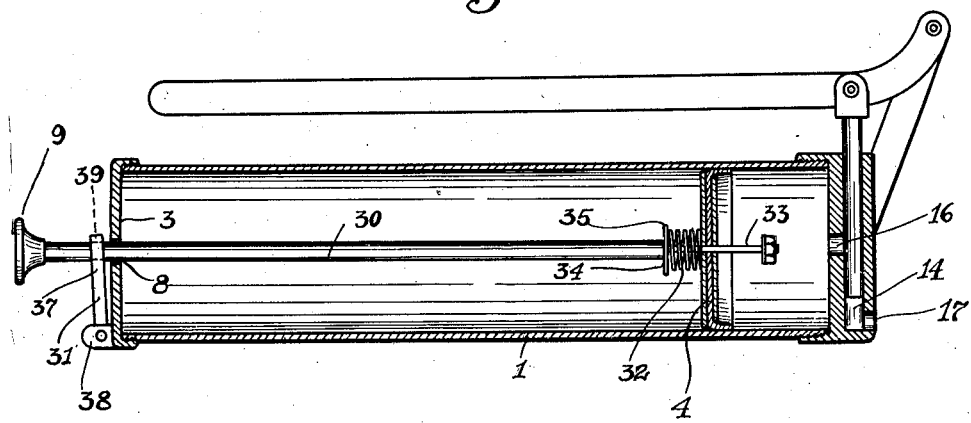
Figure 4 is a longitudinal section of a modified form of the gun.

In the drawing 1 indicates a cylinder on the forward and rear ends of which respectively screw heads 2 and 3. In the cylinder is a reciprocative piston 4 to which is connected the forward end of a piston rod 5, said rod extending through a central aperture 6 in said piston and a nut 7 screwing on the forward end of said rod against the piston. The rear end of the piston rod 5 extends through a central aperture 8 in the rear head 3 and on said end of said rod is a hand wheel 9 by means of which the rod is turned. On the piston rod 5 is formed a coarse thread 10 on which screws a nut 11 against the small end of a conical spring 12, the large end of which engages the inside of the head 3 and the extremity 13 of said large end is seated in said head. The head 2 has a bore 14 extending through one side and diametrically almost to the other side thereof in which reciprocates a plunger 15. An outlet port 16 is provided in the center of the head 2 leading from the interior of the cylinder 1 to the bore 14. An outlet port 17 is also provided in the head 2 leading from the closed end of the bore 14 to the outer side of the head, which port is threaded and into which screws one end of a flexible tube 18 on the other end of which is a coupling 19. The outer end of plunger 15 is pivotally connected by a pin 20 to an operating lever 21, the forward end of which lever is curved upwardly and pivotally connected by a pin 22, to the upper ends of links 23—23, the lower ends of which arms are pivotally connected to the head 2 at diametrically opposite points by pins 24—24 on their lower ends fitting in sockets 25—25 in said head.

The operation of my gun is as follows:

The piston rod is rotated until the piston 4 by the engagement of thread 10 with nut 11 is drawn rearwardly until it engages said nut and then the piston is pulled rearwardly further until the spring 12 is compressed. The head 2 is unscrewed from the cylinder 1 and the cylinder filled with grease forwardly of piston 4 while the spring 12 is held compressed. The head 2 is then screwed on the forward end of the piston with the plunger 15 covering the port 16 and preventing the entrance of grease into the bore 14. The tube 18 is then coupled by the coupling 19 to the bearing or other part to be greased. The lever 21 is then swung upwardly and the plunger 15 withdrawn upwardly above the port 16. The spring 12 then forces the piston 4 forwardly which forces grease through port 16 into bore 14 until said bore is filled with grease. The lever 21 is then swung downwardly and the plunger 15 inwardly which forces the grease out of the bore 14 through port 17 and tube 18 into the bearing or other part. As the grease is ejected from the cylinder the piston rod 5 is turned in the nut to compress the spring 12 to enable said spring to force the succeeding charges of grease into the bore 14.

In the modified form of my invention shown in Figure 4, the screw 10, collar 11 and spring 12 are eliminated and a rod 30 and lock 31 are substituted for said screw, while a spring 32 is substituted for the spring 12. The forward end portion 33 of rod 30 is reduced in diameter, forming at its juncture with the main portion of the rod a shoulder 34 at the rear of piston 4, on which reduced forward end portion fits a collar 35 against said shoulder, the spring 32 surrounding said reduced forward end portion between said piston and said collar. A nut 36 screws on the forward end of forward end portion 33. The lock 31 comprises an arm 37 pivoted at its lower end to lugs 38 on the head 3 and provided with an aperture 39 in its upper end through which aperture extends the rod 30.

The lock arm 37 is swung toward the head 3 to release the rod 30 so that said rod and piston may be drawn back in the cylinder 1 to admit a charge of grease therein. The rod is then pushed forward against the grease while the plunger 15 is down until the spring 32 is compressed. The spring 32 then forces the rod 30 back slightly which swings the lock arm 37 back until the rod binds against the edges of the aperture 39 and is locked by said lock arm. Upon lifting the plunger 15 the spring 32 forces the piston 4 forwardly and the piston forces the grease through port 16 into bore 14.

It will be noted, referring particularly to Figure 4, that after removal of the booster pump from the end of the cylinder 1, that grease may be drawn into the open cylinder by merely pulling on the rod 30. When the cylinder is filled with grease, the spring 32 becomes compressed between the piston and the rod of the cylinder. The lock 31 may then be locked against the rod 30 to hold the rod from movement towards the open end, thus retaining all the grease in the grease gun. The booster pump is then screwed on the open end of the cylinder and attached by a tube, such as 18, and a coupling 19, to the bearing or the like.

When the lock 31 is released, the spring 32 presses the piston against the grease, forcing it through the port 16 into the bore 14 of the booster pump, when the plunger is elevated. On the down stroke of the plunger the grease is forced out through the port 17 at high pressure. On the up strokes a vacuum is created in the bore 14, which sucks grease from the grease gun. The spring only functions to force the grease into the booster pump in the early stages. After this the suction draws the grease and the atmospheric pressure on the back of the piston causes the piston to follow up the grease as used. This is accomplished by merely releasing the lock 31 so that the rod 30 may travel inwardly and it is not necessary to manually press on the rod 30.

Having described my invention, I claim:

1. In combination, a cylinder adapted to contain grease and having a booster pump associated with the front end thereof, a rod extending slidably into the cylinder from the rear end thereof and having a piston slidable thereon, an abutment on said rod, a spring cushion bearing on the abutment and on the piston so as to urge the latter forwardly and a locking means for the rod associated with the rear end of the cylinder, the said locking means being arranged to allow the rod to be pushed forwardly but to resist rearward motion of the rod.

2. In combination, a cylinder adapted to contain grease and having a booster pump associated with the front end thereof, a rod extending slidably into the cylinder from the rear end thereof and having a piston slidable thereon, an abutment on said rod, a spring cushion bearing on the abutment and on the piston so as to urge the latter forwardly, and a link pivoted relative to rear end of the cylinder being perforated in the free end and having the rod slidable in said perforation, the link and its perforation being formed to bind the rod against rearward motion.

In testimony whereof I affix my signature.

ALBERT T. SHERE.